United States Patent

Malcolm et al.

[19]

[11] Patent Number: 6,128,701
[45] Date of Patent: Oct. 3, 2000

[54] ADAPTIVE AND PREDICTIVE CACHE REFRESH POLICY

[75] Inventors: Michael Malcolm, Woodside, Calif.; Ian Telford, Waterloo, Canada

[73] Assignee: Cache Flow, Inc.

[21] Appl. No.: 08/959,058

[22] Filed: Oct. 28, 1997

[51] Int. Cl.[7] .................................................. G06F 12/00
[52] U.S. Cl. ........................ 711/133; 711/133; 711/134
[58] Field of Search .................................. 711/118, 133, 711/134, 135, 136; 365/203, 222, 228

[56] References Cited

U.S. PATENT DOCUMENTS

| | | | |
|---|---|---|---|
| 5,452,440 | 9/1995 | Salsburg ................................ | 711/136 |
| 5,452,447 | 9/1995 | Nelson et al. ......................... | 707/205 |
| 5,649,154 | 7/1997 | Kumar et al. . | |
| 5,752,022 | 5/1998 | Chiu et al. ............................ | 395/610 |
| 5,787,470 | 7/1998 | DeSimone et al. .................... | 711/124 |
| 5,802,292 | 9/1998 | Mogul . | |
| 5,819,045 | 10/1998 | Raman et al. ..................... | 395/200.56 |
| 5,852,717 | 12/1998 | Bhide et al. ...................... | 395/200.33 |
| 5,860,106 | 1/1999 | Domen et al. ....................... | 711/137 |
| 5,870,769 | 2/1999 | Freund . | |
| 5,878,218 | 3/1999 | Maddalozzo et al. ............. | 395/200.43 |
| 5,884,046 | 3/1999 | Antonov ............................ | 395/200.68 |
| 5,887,151 | 3/1999 | Raz et al. . | |
| 5,892,937 | 4/1999 | Caccavale ............................ | 711/135 |
| 5,896,506 | 4/1999 | Ali et al. ........................... | 395/200.43 |
| 5,905,999 | 5/1999 | Liu et al. . | |
| 5,913,033 | 6/1999 | Grout ................................ | 395/200.49 |
| 5,946,682 | 8/1999 | Wolfe ................................. | 707/5 |
| 5,948,062 | 9/1999 | Tzelnic .............................. | 709/219 |
| 5,950,205 | 9/1999 | Aviani, Jr. ......................... | 707/103 |
| 5,954,795 | 9/1999 | Tomita et al. ...................... | 709/218 |
| 5,961,602 | 10/1999 | Thompson et al. .................. | 709/229 |
| 5,964,830 | 10/1999 | Durrett ............................... | 709/200 |

OTHER PUBLICATIONS

Dingle A et al: "Web cache coherence" Computer Network and ISDN system, vol. 28, Issue: 11, pp. 907–920, May 1996, Elsevier Science.

Microsoft® Proxy Server Version 2.0, High Performance Web Caching and Firewall Security in One Affordable, Integrated Product, Reviewer Guide.

Dias G.ET ALI: "A Smart Internet Caching System" Proceeding of the Inet'96 Conference, Montreal, Canada, Jun. 24–28, 1996.

Wang Z et al: "Prefetching in World Wide Web". IEEE Globecom 1996, Communications: The Key to Global Prosperity. Global Internet' 96. London, UK, 18–22 NO. , pp. 28–32.

Chinen K. et al: An Interactive Prefetching Proxy Server for Improvement of WWW Latency' Proceedings of the Inet' 97 Conference, Kuala Lumpur, Malaysia, Jun. 24–27, 1997.

*Primary Examiner*—Do Hyun Yoo
*Assistant Examiner*—Mehdi Namazi
*Attorney, Agent, or Firm*—Swernofsky Law Group

[57] ABSTRACT

The invention provides a system and system for automatically refreshing documents in a cache, so that each particular document is refreshed no more often and no less often than needed. For each document, the cache estimates a probability distribution of times for client requests for that document and a probability distribution of times for server changes to that document. Times for refresh are selected for each particular document in response to both the estimated probability distribution of times for client requests and the estimated probability distribution of times for server changes. The invention also provides a system and system for objectively estimating the value the cache is providing for the system including the cache. The cache estimates for each document a probability distribution of times for client requests for that document, and determines a cumulative probability distribution which reflects the estimated marginal hit rate at the storage limit of the cache and the marginal advantage of adding storage to the cache.

59 Claims, 2 Drawing Sheets

ADAPTIVE AND PREDICTIVE CACHE REFRESH POLICY

BACKGROUND OF THE INVENTION

1. Field of the Invention

This invention relates to caches.

2. Related Art

When a client device seeks to obtain information from server devices on a network, it is sometimes desirable to provide a cache, that is, a device which maintains copies of that information so that multiple requests for the same information can be satisfied at the cache, and do not require that information to be transmitted repeatedly across the network. Known caches do this to reduce the amount of communication bandwidth used between the clients and the servers, and when shared by more than one client, act to reduce the total amount of communication bandwidth used between all of the clients and the servers.

One problem in the art is that information requested a second time (possibly requested a second time by the same client, or requested by a second client after a first client has already requested that information once) can change at the server between the time it is first requested and the time it is requested again. In such cases, transmitting the stored information from the cache gives inaccurate information to the second requester. This can reduce the confidence users at the client devices have for the information provided by the cache.

One known method is to transmit each request from the client device to the server, so as to obtain an answer as to whether the document must be refreshed before it is served (transmitted) to the client device. While this method achieves the purpose of serving only refreshed information to the client device, it has the drawback that the client device must wait for contact with the server device and the reply from the server device, even when the information is already present in the cache. Moreover, this method uses communication bandwidth by sending requests to the server device and receiving confirmations from the server device which can be unnecessary.

It would be advantageous to provide a cache which reduces the average amount of time users at the client device wait for information, rather than attempting to reduce the amount of communication bandwidth between the client devices and the server devices. One aspect of the invention is to automatically refresh the information maintained in the cache, notwithstanding that this uses additional communication bandwidth. The cache occasionally queries the server device to determine if the document has been changed, so the cache can maintain an up-to-date version of the document. When the document is requested by the client device, the cache serves that document immediately without checking with the server device.

Refreshing information in the cache is useful, but some documents require refresh more often than others. If a particular document is selected for refresh less often than required, it will sometimes be served to the client device even though it is "stale" (that is, modified at the server since the cache last obtained a copy). In contrast, if a particular document is selected for refresh more often than required, the document will sometimes be refreshed unnecessarily, thus wasting communication bandwidth.

Accordingly, it would be advantageous to provide a method and system for refreshing documents so that each particular document is refreshed no more often and no less often than needed. This advantage is achieved in a system in which the times for refresh are tailored to each particular document, in response to both an estimated probability distribution of times for client requests for that document and an estimated probability distribution of times for server changes to that document.

Another problem in the art is that it is difficult to objectively determine the value the cache is providing for the system including the cache, or whether the cache is too small or too large. In contrast with persistent storage devices, for which it is easy to determine how full they are and whether the size of the storage device is too small or too large, the cache is nearly always nearly full of data being stored for later request by the client device.

One known method to determine the value of the cache is to measure the cache "hit rate," that is, the fraction of information requests which are for documents already maintained in the cache. However, this measure is extremely dependent on the degree of locality of reference to information requested by the client device, which in turn is extremely dependent on the number of client devices, the nature of information they are requesting, and the rate at which they request that information.

Accordingly, it would be advantageous to provide a method and system for objectively estimating the value the cache is providing for the system including the cache, such as whether the cache is too small or too large for selected objectives. This advantage is achieved in a system in which the cache estimates for each document a probability distribution of times for client requests for that document, and determines a cumulative probability distribution which reflects the estimated marginal hit rate at the storage limit of the cache and the marginal advantage of adding storage to the cache.

SUMMARY OF THE INVENTION

The invention provides a method and system for automatically refreshing documents in a cache, so that each particular document is refreshed no more often and no less often than needed. For each document, the cache estimates a probability distribution of times for client requests for that document and a probability distribution of times for server changes to that document. Times for refresh are selected for each particular document in response to both the estimated probability distribution of times for client requests and the estimated probability distribution of times for server changes.

The invention also provides a method and system for objectively estimating the value the cache is providing for the system including the cache. The cache estimates for each document a probability distribution of times for client requests for that document, and determines a cumulative probability distribution which reflects the estimated marginal hit rate at the storage limit of the cache and the marginal advantage of adding storage to the cache.

DETAILED DESCRIPTION OF THE PREFERRED EMBODIMENTS

In the following description, a preferred embodiment of the invention is described with regard to preferred process steps and data structures. Those skilled in the art would recognize after perusal of this application that embodiments of the invention can be implemented using general purpose processors or special purpose processors or other circuits adapted to particular process steps and data structures described herein, and that implementation of the process steps and data structures described herein would not require undue experimentation or further invention.

Inventions disclosed herein can be used in conjunction with inventions disclosed in one or more of the following patent applications:

Provisional U.S. application Ser. No. 60/048,986, filed Jun. 9, 1997, in the name of inventors Michael Malcolm and Robert Zarnke, titled "Network Object Cache Engine", assigned to CacheFlow, Inc., attorney docket number CASH-001.

U.S. application Ser. No. 08/959,313, filed this same day, in the name of inventors Doug Crow, Bert Bonkowski, Harold Czegledi, and Tim Jenks, titled "Shared Cache Parsing and Pre-fetch", assigned to CacheFlow, Inc., attorney docket number CASH-004.

These applications are referred to herein as the "Cache Disclosures," and are hereby incorporated by reference as if fully set forth herein.

System Elements

Figure 1:
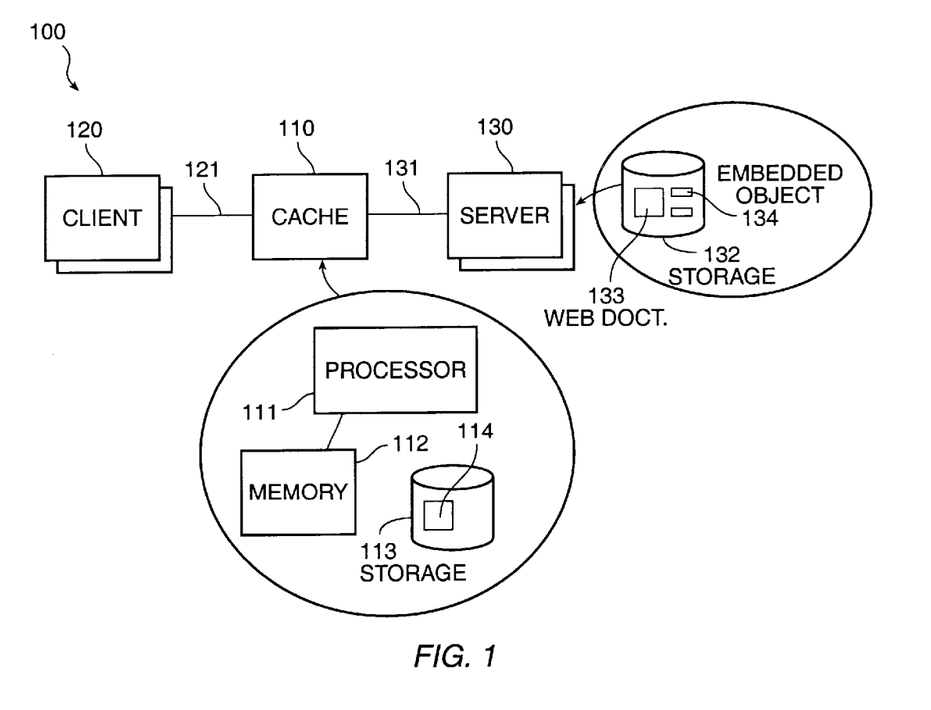
FIG. 1 shows a block diagram of a system for periodically refreshing documents in a cache.

FIG. 1 shows a block diagram of a system for periodically refreshing documents in a cache.

A system 100 includes a cache 110, at least one client device 120, and at least one server device 130. Each client device 120 is coupled to the cache 110 using a client communication path 121, such as a dial-up connection, a LAN (local area network), a WAN (wide area network), or some combination thereof. Similarly, each server device 130 is also coupled to the cache 110 using a server communication path 131, such as a dial-up connection, a LAN (local area network), a WAN (wide area network), or some combination thereof. In a preferred embodiment, the client communication path includes a LAN, while the server communication path 131 includes a network of networks such as an internet or intranet.

As used herein, the terms "client" and "server" refer to a relationship between the client or server and the cache 110, not necessarily to particular physical devices. As used herein, one "client device" 120 or one "server device" 130 can comprise any of the following: (a) a single physical device capable of executing software which bears a client or server relationship to the cache 110; (b) a portion of a physical device, such as a software process or set of software processes capable of executing on one hardware device, which portion of the physical device bears a client or server relationship to the cache 110; or (c) a plurality of physical devices, or portions thereof, capable of cooperating to form a logical entity which bears a client or server relationship to the cache 110. The phrases "client device" 120 and "server device" 130 refer to such logical entities and not necessarily to particular individual physical devices.

The server device 130 includes memory or storage 132 having a web document 133. In a preferred embodiment, the web document 133 can include text and directions for display, pictures, such as data in GIF or JPEG format, other multimedia data, such as animation, audio (such as streaming audio), movies, video (such as streaming video), program fragments, such as Java, Javascript, or ActiveX, or other web documents, such as when using frames.

The cache 110 includes a processor 111, program and data memory 112, and mass storage 113. The cache 110 maintains a first set of web objects 114 in the memory 112 and a second set of web objects 114 in the storage 113.

In a preferred embodiment, the cache 110 includes a cache device such as described in the Cache Disclosures defined herein, hereby incorporated by reference as if fully set forth therein.

The cache 110 receives requests from the client device 120 for a web object 114 and determines if that web object 114 is present at the cache 110, either in the memory 112 or in the storage 113. If the web object 114 is present in the memory 112, the cache 110 transmits the web object 114 to the client device 120 using the client communication path 121. If the web object 114 is present in the storage 113 but not in the memory 112, the cache 110 loads the web object 114 into the memory 112 from the storage 113, and proceeds as in the case when the web object 114 was originally present in the memory 112. If the web object 114 is not present in either the memory 112 or the storage 113, the cache 110 retrieves the web object 114 from the appropriate server device 130, places the web object 114 in the memory 112 and the storage 113, and proceeds as in the case when the web object 114 was originally present in the memory 112.

Due to the principle of locality of reference, it is expected that the cache 110 will achieve a substantial "hit rate," in which many requests from the client device 120 for web objects 114 will be for those web objects 114 already maintained by the cache 110, reducing the need for requests to the server device 130 using the server communication path 131.

Determining Expected Frequencies

For each web object 114, the cache 110 determines a probability that the web object 114 is stale at time t, and a probability that the web object 114 is requested at request h:

$$P_{si}(t) = \text{Probability \{object i is stale at time t\}} \quad (141)$$

$$P_{ri}(h) = \text{Probability \{object i is requested at request h\}} \quad (142)$$

The probability of request $P_{ri}(h)$ is measured for "request h" rather than for "time t," so that the probability $P_{di}(h)$ is not distorted by changes in the frequency of requests. The frequency of requests can change, for example, while the cache 110 is being moved from one location to another, such as its original shipment, or while there are relatively few client devices 120 requesting web objects 114 from the cache 110, such as early in the morning or late at night. The probability $P_{ri}(h)$ is thus responsive to "request time" h rather than "wall-clock time" t.

In a preferred embodiment, the cache 110 maintains a value for "request time" h, since a request-time of zero when the cache 110 was first manufactured, and stores that value in a non-volatile memory.

Having defined the probabilities $P_{si}(t)$ and $P_{ri}(h)$, the probability that the web object 114 will be served stale by the cache 110 on the next request is the product of the probabilities $P_{si}(t) \cdot P_{ri}(h)$:

$$P_i(\text{current time, current request}) = P_{si}(\text{current time}) \cdot P_{ri}(\text{current request}) = \text{Probability \{ object i is stale at this time and object i is requested at this request-time \}} \quad (143)$$

Thus, each web object 114 i has a corresponding product $P_i$ (current time, current request-time), which indicates the probability that the web object 114 will be served stale by the cache at the next request. The sum of such products $P_i$ (current time, current request-time) for all web objects 114 i in the cache 110 is the cumulative probability that the next web object 114 requested by one of the client devices 120 will be served stale by the cache 110.

The cache 110 chooses to attempt to refresh the web object 114 with the highest such product Pi (current time, current request-time). The cache 110 automatically attempts to refresh web objects 114 until the cumulative probability of all products Pi (current time, current request-time) is less than a selected threshold value. In a preferred embodiment, the selected threshold value is between about 1% and about 5%.

The probabilities Psi (t) and Pri (h) each follow a Poisson distribution, that is, that the probability of a particular web object 114 becoming stale in any particular time interval is responsive to a random process having a Poisson distribution; the probability of a particular web object 114 being requested in any particular request-time interval is also responsive to a random process having a Poisson distribution.

Accordingly, the cache 110 estimates Psi (t) as follows:

$$\text{Psi (t)} = 1 - \exp(-a\,t) \quad (144)$$

where the function exp is exponentiation using the natural base e, and the value a is a parameter of the Poisson process.

It follows that $$a = \ln(2)/\text{EUI} \quad (145)$$

where ln (2) is the natural logarithm of 2 (approximately 0.69315), and EUI is the estimated mean interval between updates to the web object 114 i at the server device 130.

EUI and similar values described herein are specific to each web object 114 i, and are determined separately for each web object 114 i. However, for convenience in notation, the term "EUI" and similar terms are not subscripted to so indicate.

Accordingly, the cache 110 estimates EUI in response to the times of actual updates of the web object 114 at the server device 130, and is able to determine Psi (t) in response to EUI.

Similarly, the cache 110 estimates Pri (h) as follows:

$$\text{Pri (h)} = b\,\exp(-b\,h) \quad (146)$$

where
the value b is a parameter of the Poisson process.
It follows that $$\text{Pri (current request-time)} = \ln(2)/\text{EAI} \quad (147)$$

where EAI is the estimated mean interval between requests for the web object 114 i at the cache 110 (that is, from any client device 120).

Accordingly, the cache 110 estimates EAI in response to the request-times of actual requests for the web object 114 from any client device 120, and is able to determine Pri (h) in response to EAI.

Method of Operation

Figure 2:
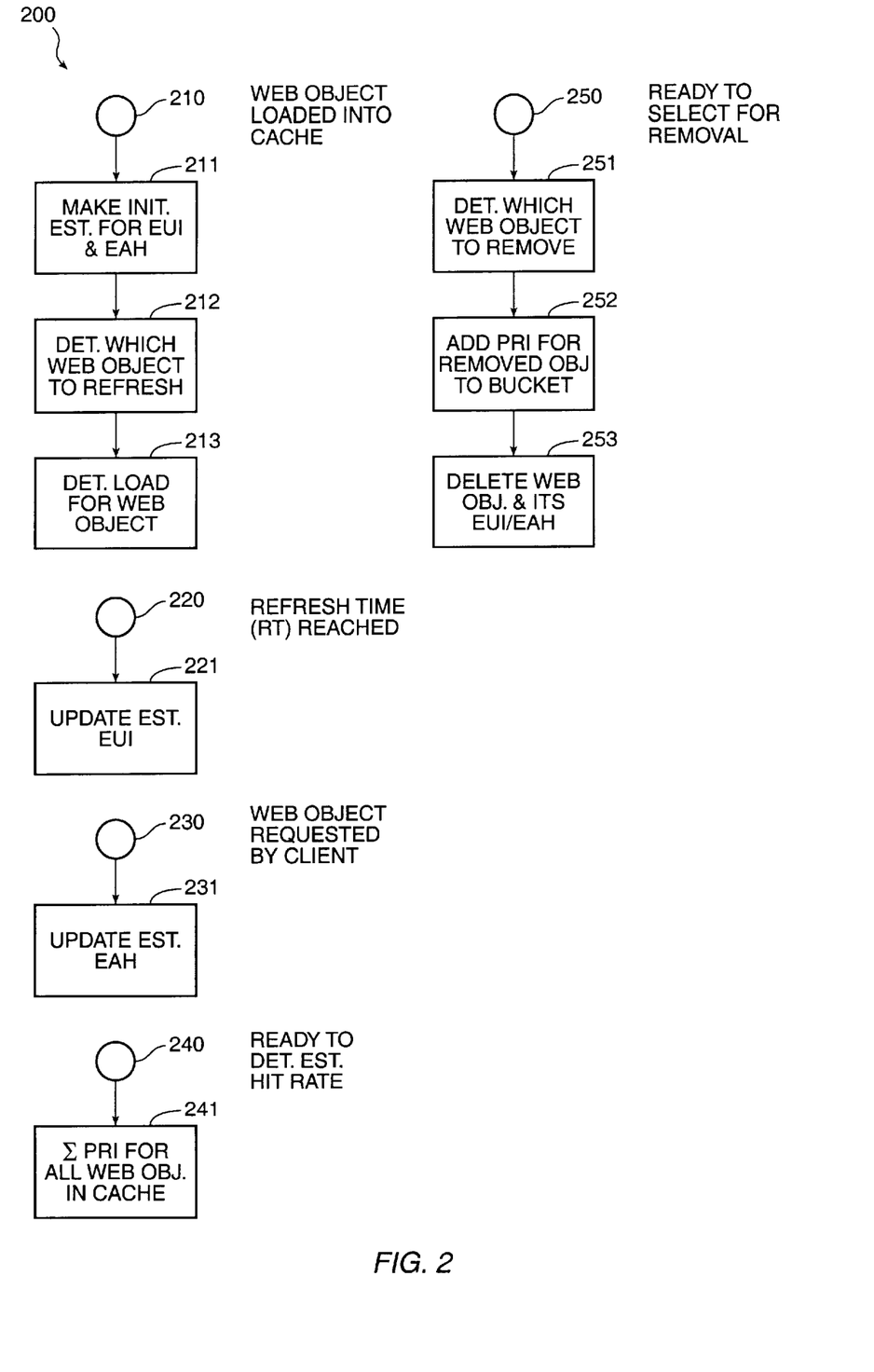
FIG. 2 shows a process flow diagram of a method for periodically refreshing documents in a cache.

FIG. 2 shows a process flow diagram of a method for periodically refreshing documents in a cache.

A method 200 includes a set of flow points to be noted, and steps to be executed, cooperatively by the system 100, including the cache 110, the client device 120, and the server device 130.

At a flow point 210, a particular web object 114 is loaded into the cache 110. The particular web object 114 can be loaded into the cache 110 in one of two ways:

Initial load: The web object 114 was first requested from the cache 110 by one of the client devices 120, found not to be maintained in the cache 110, requested by the cache 110 from one of the server devices 130, transmitted by the server device 130 to the cache 110, stored by the cache 110, and transmitted by the cache 110 to the requesting client device 120; or Reload: The web object 114 was maintained in the cache 110 after a previous initial load or reload, found by the cache 110 to be stale, and reloaded by the cache 110 from one of the server devices 130.

At a step 211, the cache 110 makes an initial estimate of the values of EUI and EAI for the particular web object 114.

In a preferred embodiment, the cache 110 performs the step 211 by determining a type for the web object 114, and making its initial estimate of the values of EUI and EAI in response to that type. The cache 110 determines the type for the web object 114 in response to information in the HTTP (hypertext transfer protocol) response made by the server device 130. The web object 114 can be one of the following types:

type T: a web object 114 for which an expiration time (XT), sometimes called a "time to live" or "TTL," is specified by the server device 130;

type M: a web object 114 for which a last-modified time (MT) is specified, but no XT is specified, by the server device 130;

type N: a web object 114 for which no MT or XT is specified by the server device 130.

In a preferred embodiment, the cache 110 estimates a value for EUI in response to the type determined for the web object 114.

For the initial load of the web object 114 into the cache 110, the following values are used:

$$\text{type T: EUI} = \max(\text{XT}-\text{LT}, 900) \text{ seconds} \quad (151)$$

where the function max indicates the maximum of the values.

$$\text{type M: EUI} = \max(10\% \text{ of } (\text{LT}-\text{MT}), 900) \text{ seconds} \quad (152)$$

$$\text{type N: EUI} = 900 \text{ seconds} \quad (153)$$

In a preferred embodiment, the values 10% and 900 are parameters which can be set by an operator for the cache 110. In alternative embodiments, the 10% and 900 can be determined by the cache 110 responsive to global parameters of the cache 110. For example, the value 900 may be replaced by an average of EUI for all web objects 114 maintained in the cache 110.

The values shown herein are just initial estimates for EUI for each web document 114. In alternative embodiments, there might be many other ways to select initial estimates for EUI for each web document 114.

Similarly, in a preferred embodiment, the cache 110 estimates a value for EAI. In a preferred embodiment, the cache 110 makes an initial estimate for EAI equal to the mean value for EAM for all web documents 114 maintained in the cache 110.

At a step 212, the cache 110 determines which of the web objects 114 to refresh.

The cache 110 performs the step 212 by determining the probabilities Psi (t) and Pri (h) for each web object 114 i and selecting for refresh the web object 114 i with the largest product Pi (current time, current request-time).

The cache 110 refreshes the selected web object 114 and repeats the step 212 so long as the cumulative sum of the products Pi (current time, current request-time) is larger than a selected threshold. As noted herein, in a preferred embodiment the selected threshold is between about 1% and about 5%, although a wide range of other values are likely also to be workable.

At a flow point 220, a selected refresh time (RT) for a particular web object 114 is reached. The selected refresh time equals the latest load time (LT) plus EUI.

At a step 221, the cache 110 updates its estimated EUI for the web object 114, in response to an update history for the web object 114, as follows:

$$\text{new EUI}=(1-\text{alpha})\,(\text{old EUI})+(\text{alpha})\,(\text{UT-LT}) \qquad (171)$$

where UT=time the web object 114 is actually updated at the cache 110, and LT=time the web object 114 is actually loaded or reloaded at the cache 110.

In a preferred embodiment, the value of the smoothing constant alpha is about 0.4, but a wide range of values between 0 and 1 are likely to be usable.

In a preferred embodiment, EUI is only updated when the web object 114 is actually updated at the cache 110. However, in alternative embodiments, EUI may be updated at other events, such as when the selected refresh time RT exceeds the sum (LT+EUI), that is, the web object 114 is not actually updated until after the estimated mean refresh time RT. More generally, in alternative embodiments, EUI may be updated responsive to (1) the last time at which the web object 114 was actually updated, (2) the amount of time actually passed since that update, and (3) any earlier estimate for EUI.

At a flow point 230, the particular web object 114 is requested by at least one client device 120.

At a step 231, the cache 110 updates its estimated EAI for the web object 114, in response to an request history for the web object 114, as follows:

$$\text{new EAH}=(1-\text{alpha})\,(\text{old EAH})+(\text{alpha})\,(\text{AH-LH}) \qquad (181)$$

where AH=request-time the web object 114 is actually requested by one of the client devices 120, and
LH=request-time the web object 114 was last requested by one of the client devices 120.

In a preferred embodiment, EAI is only updated when the web object 114 is actually requested by one of the client devices 120. However, in alternative embodiments, EAI may be updated at other events, such as when the time between requests exceeds EAI, that is, the web object 114 is not actually requested until after the estimated mean request interval. More generally, in alternative embodiments, EAI may be updated responsive to (1) the last time at which the web object 114 was actually requested, (2) the amount of request-time actually passed since that request, and (3) any earlier estimate for EAI.

In a preferred embodiment, the value of the smoothing constant alpha is about 0.4, but a wide range of values between 0 and 1 are likely to be usable.

At a flow point 240, the cache 110 is ready to determine an estimated cache hit rate.

At a step 241, the cache 110 sums the values of Pdi (current request-time) for all web objects 114 in the cache 110.

The sum of all Pri (current request-time) is an estimate of the probability that the next web object 114 to be requested is one of the web objects 114 maintained in the cache 110, that is, an estimate of the probability of a cache hit.

At a flow point 250, the cache 110 is ready to select a particular web object 114 for removal.

At a step 251, the cache 110 determines which of the web objects 114 to remove.

The cache 110 performs the step 213 by determining the load duration for the web object 114.

$$\text{new LD}=(1-\text{alpha})\,(\text{old LD})+(\text{alpha})\,(c+t) \qquad (191)$$

where alpha=a smoothing constant, preferably about 0.25,
c=actual connection time to the server device 130 for this load or reload, and
t=actual transmission time to the server device 130 for this load or reload.

In a preferred embodiment, the value 0.25 for alpha is a parameter which can be set by an operator for the cache 110.

In alternative embodiments, the value LD can be estimated by independently estimating LDc and LDt, as follows:

$$\text{LD}=\text{LDc}+\text{LDt} \qquad (192)$$

where LDc=estimated connection time to the server device 130, and
LDt=estimated transfer time of the web object 114 from the server device 130.

Each time the web object 114 is loaded or reloaded from the server device 130, the cache 110 revises its estimates for LDc and LDt, as follows:

$$\text{new LDc}\,(1-\text{alpha})\,(\text{old LDc})+(\text{alpha})\,(c) \qquad (193)$$

$$\text{new LDt}=(1-\text{alpha})\,(\text{old LDt})+(\text{alpha})\,(t) \qquad (194)$$

The cache 110 uses the estimated load duration LD for the web object 114, the size s of the web object 114, and the probability Pri (h) for each web object 114 i, and s elects the web object 114 with the smallest product (LD/s). Pri (current request) for removal.

At a step 252, the cache 110 adds the value Pri (current request) it determined for the web object 114 to one of a set of summation buckets.

In a preferred embodiment, each summation bucket is used to sum about 10,000 sequential values of Pri (h). In an environment in which the mean size for web documents 114 is about eight kilobytes and each disk drive is about two gigabytes, each bucket therefore represents the marginal value of about $\frac{1}{25}$ of a disk drive.

In a preferred embodiment, there are about 50 summation buckets, which are selected and filled in a round-robin manner. In an environment in which the mean size for web documents 114 is about eight kilobytes and each disk drive is about two gigabytes, the set of 50 buckets therefore represents the marginal value of about two disk drives.

At a step 253, the cache 110 deletes the web object 114 and its estimated values EUI and EAH.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method of operating a cache, including steps of:
   automatically refreshing a set of objects maintained in said cache in response to an estimate for each particular object in said set that said object is stale wherein aid step of automatically refreshing includes the steps of:

for each said object, estimating a probability that said object will be next requested and will also be stale;

automatically refreshing a first object in response to said probability that said object will be next requested and will also be stale;

wherein said step of estimating includes the steps of:

estimating a first probability distribution of client requests for said object;

estimating a second probability distribution of server changes to said object; and estimating said probability that said object will be next requested and will also be stale in response to said first probability distribution and said second probability distribution.

2. A method as in claim 1, wherein said step of automatically refreshing is responsive to an estimate for said particular object that said object will be requested soon.

3. A method as in claim 1, wherein said first object has a largest said probability that said object will be next requested and will also be stale.

4. A method as in claim 1, wherein said step of estimating said probability that said object will be next requested and will also be stale is responsive to a product of said first probability distribution and said second probability distribution.

5. A method as in claim 1, wherein said step of estimating includes updating an estimated probability distribution for each object in response to a request history for said object.

6. A method as in claim 5, wherein said step of updating includes the steps of determining an initial estimated probability distribution of client requests for said object; and updating said estimated probability distribution of client requests for said object in response to said request history.

7. A method as in claim 5, wherein said step of updating includes the steps of determining an initial estimated probability distribution of client requests for said object;

determining a new estimated probability distribution of client requests for said object in response to said request history; and determining a composite value of said initial estimated probability distribution and said new estimated probability distribution.

8. A method as in claim 1, wherein said step of estimating said probability that said object will be next requested and will also be stale includes updating said probability for each object in response to an update history or said object.

9. A method as in claim 8, wherein said step of updating includes the steps of determining an initial estimated probability distribution of server changes to said object; and updating said estimated probability distribution of server changes to said object in response to said update history.

10. A method as in claim 8, wherein said step of updating includes determining an initial estimated probability distribution of server changes to said object in espouse to information provided with said object by a server device.

11. A method as in claim 8, wherein said step of updating includes the steps of determining an initial estimated probability distribution of server changes to said object;

determining a new estimated probability distribution of server changes to said object in response to said update history; and determining a composite value of said initial estimated probability distribution and said new estimated probability distribution.

12. A method of operating a cache, including the steps of:

determining, for each object in a set of objects maintained in said cache, a probability of client requests for said object and an expected load duration for said object;

selecting particular object for removal in response to said probability of client requests for said object and said expected load duration for said object, wherein the step of determining includes steps of:

determining an initial estimated probability distribution of client requests for said object; and updating said estimated probability distribution of client requests for said object in response to a request history whereby said probability for each object is updated in response to said request history for said object.

13. A method as in claim 12, wherein said step of selecting is responsive to a product of load duration per unit size and said probability of client requests for each said object.

14. A method of operating a cache, including the steps of:

determining, for each object in a set of objects maintained in said cache a probability of client requests for said object and an expected load duration for said objects; and selecting a particular object for removal in response to said probability of client requests for said object and said expected load duration for said object;

wherein the step of determining includes steps of:

determining an initial estimated probability distribution of client requests for said object;

determining a new estimated probability distribution of client requests for said object in response to a request history; and determining a composite value of said initial estimated probability distribution an said new estimated probability distribution whereby said probability for each object is updated in response to said request history for said object.

15. A method as in claim 12, wherein said step of determining said probability of client requests includes updating said expected load duration for each objects in response to said request history for said object.

16. A method as in claim 15, wherein said step of updating includes the steps of determining an initial expected load duration for said object; and updating said expected load duration for said object in response to said request history.

17. A method as in claim 15, wherein said step of updating includes the steps of estimating an initial expected load duration for said object;

estimating a new expected load duration for said object in response to said request history; and determining a composite value of said initial expected load duration and said new expected load duration.

18. A method as in claim 15, wherein said step of updating includes the step of updating said expected load duration for a particular object when said particular object is reloaded.

19. A system, including a cache; and means for automatically refreshing a set of objects maintained in said cache in response to an estimate for each particular object in said set that said object is stale;

wherein said means for automatically refreshing includes:
    means for estimating for each said object, a probability that said object will be next requested and will also be stale;
    means for automatically refreshing a first object in response to said probability that said object will be next requested and will also be stale
and wherein said means for estimating includes:
    memory storing an estimate of a first probability distribution of client requests for said object;
    memory storing estimate of a second probability distribution of server changes to said object; and
    means for estimating said probability that said object will be next requested and will also be stale in response to said first probability distribution and said second probability distribution.

20. A system as in claim 19, wherein said means for automatically refreshing is responsive to an estimate for said particular object that said object will be requested soon.

21. A system as in claim 19, wherein said first object has a largest said probability that said object will be next requested and will also be stale.

22. A system as in claim 19, wherein said means for estimating said probability that said object will be next requested and will also be stale is responsive to a product of said first probability distribution and said second probability distribution.

23. A system as in claim 19, wherein said means for estimating includes means for updating an estimated probability distribution for each object in response to a request history for said object.

24. A system as in claim 23, wherein said means for updating includes
    memory storing an initial estimated probability distribution of client requests for said object; and
    means for updating said estimated probability distribution of client requests for said object in response to said request history.

25. A system as in claim 23, wherein said means for updating includes
    means to determining an initial estimated probability distribution of client requests for said object;
    means for determining a new estimated probability distribution of client requests for sat object in response to said request history; and
    means for determining a composite value of said initial estimated probability distribution and said new estimated probability distribution.

26. A system as in claim 19, wherein said means for estimating said probability that said object will be next requested and will also be stale includes means for updating said probability for each object in response to an update history or said object.

27. A system as in claim 26, wherein said means for updating includes
    means for determining an initial estimated probability distribution of server changes to said object; and
    means for updating said estimated probability distribution of server changes to said object in response to said update history.

28. A system as in claim 26, wherein said means for updating includes means for estimating an initial estimated probability distribution of server changes to said object in response to information provided with said object by a server device.

29. A system as in claim 26, wherein said means for updating includes
    means for determining an initial estimated probability distribution of server changes to said object;
    means for determining a new estimated probability distribution of server changes to said object in response to said update history; and
    means for determining a composite value of said initial estimated probability distribution and said new estimated probability distribution.

30. A system for operating a cache, including
    means for determining, for each object in a set of objects maintained in said cache, a probability of client requests for said object and an expected load duration for said object;
    means for updating said probability for each object in response to a request history for said object; and
    means for selecting a particular object for removal in response to said probability of client requests for said object and said expected load duration for said object, wherein said means for selecting is responsive to a product of load duration per unit size and said probability of client requests for each said object.

31. A system as in claim 30, wherein said means for updating includes
    means for determining an initial estimated probability distribution of client requests for said object; and
    means for updating said estimated probability distribution of client requests for said object in response to said request history.

32. A system as in claim 30, wherein said means for updating includes
    means for determining an initial estimated probability distribution of client requests for said object;
    means for determining a new estimated probability distribution of client requests for said object in response to said request history; and
    means for determining a composite value of said initial estimated probability distribution and said new estimated probability distribution.

33. A system as in claim 30, further including means for updating said expected load duration for each object in response to said request history for said object.

34. A system as in claim 3, wherein said means for updating said expected load duration includes
    means for estimating an initial expected load duration for said object; and
    means for updating said expected load duration for said object in response to said request history.

35. A system as in claim 33, wherein said means for updating said expected load duration includes
    means to estimating an initial expected load duration for said object;
    means for estimating a new expected load duration for said object in response to request history; and
    means for determining a composite value of said initial expected load duration and aid new expected load duration.

36. A system as in claim 33, wherein said means for updating sad expected load duration includes means for updating said expected load duration for a particular object when said object is reloaded.

37. A system, including
    a cache;
    a cache refresh mechanism configured to automatically refresh a set of objects maintained in said cache in response to an estimate for each particular object in said set that said object is stale; wherein said cache refresh mechanism includes:

a first probability determination mechanism configured to estimate, for each said object a probability that said object will be next requested and will also be stale;

a refresh mechanism configured to automatically refresh a first object in response to said probability that said object will be next requested and will also be stale;

and wherein said first probability determination mechanism includes:

memory storing an estimate of a first probability distribution of clients requests for said object;

memory storing an estimate of a second probability distribution of server changes to said object; and a second probability determination mechanism configured to estimate said probability that said object will be next requested and will also be stale in response to said first probability distribution and said second probability distribution.

38. A system as in claim 37, wherein said cache refresh mechanism is responsive to an estimate for said particular object that said object will be requested soon.

39. A system as in claim 37, wherein said first object has a largest said probability that said object will be next requested and will also be stale.

40. A system as in claim 37, wherein said first probability determination mechanism is responsive to a product of said first probability distribution and said second probability distribution.

41. A system as in claim 37, wherein said first probability determination mechanism includes an update mechanism configured to update an estimated probability distribution for each object in response to a request history for said object.

42. A system as in claim 41, wherein said update mechanism includes memory storing an initial estimated probability distribution of client requests for said object; and a second update mechanism configured to update said estimated probability distribution of client requests for said object in response to said request history.

43. A system as in claim 41, wherein said update mechanism includes an initial probability determination mechanism configured to determine an initial estimated probability distribution of client requests for said object;

a new probability determination mechanism configured to determine a new estimated probability distribution of client requests for said object in response to said request history; and a composite determination mechanism configured to determine a composite value of said initial estimated probability distribution and said new estimated probability distribution.

44. A system as in claim 37, wherein said first probability determination mechanism includes an update mechanism configured to update said probability for each object in response to an update history for said object.

45. A system as in claim 44, wherein said update mechanism includes an initial probability determination mechanism configured to determine an initial estimated probability distribution of server changes to said object; and a probability distribution update mechanism configured to update said estimated probability distribution of server changes to said object in response to said update history.

46. A system as in claim 44, wherein said update mechanism includes an initial probability distribution mechanism configured to determine an initial estimated probability distribution of server changes to said object in response to information provided with said object by a server device.

47. A system as in claim 44, wherein said update mechanism includes an initial probability determination mechanism configured to determine an initial estimated probability distribution of server changes to said object;

a new probability determination mechanism configured to determine a new estimated probability distribution of server changes to said object in response to said update history; and a composite determination mechanism configured to determine a composite value of said initial estimated probability distribution and said new estimated probability distribution.

48. A system for operating a cache, including a first probability determination mechanism configured to determine, for each object in a set of objects maintained in said cache, a probability of client requests for said object and an expected load duration for each said object; and a selection mechanism configured to select a particular object for removal in response to said probability of client requests for said object and said expected load duration for said object;

wherein said first probability determination mechanism includes:

a determination mechanism configured to determine an initial estimated probability distribution of client requests for said object; and a first update mechanism configured to update said estimated probability distribution of client requests for said object in response to a request history whereby said probability for each object is updates in response to said request history for said object.

49. A system as in claim 48, wherein said selection mechanism is responsive to a product of load duration per unit size and said probability of client requests for each said object.

50. A system for operating a cache including:

a first probability determination mechanism configured to determine, for each object in a set of objects maintained in said cache, a probability of client requests for said object and an expected load duration for said object; and a selection mechanism configured to select a particular object for removal in response to said probability of client requests for said object and said expected load duration for said object;

wherein said first probability determination mechanism includes:

an initial probability determination mechanism configured to determine an initial estimated probability distribution of client requests for said object;

a new probability determination mechanism configured to determine a new estimated probability distribution of client requests for said object in response to a request history; and a composite determination mechanism configured to determine a composite value of said initial estimated probability distribution and said new estimated probability distribution whereby said probability for each object is updated in response to said request history for said object.

51. A system as in claim 48, wherein said first probability determination mechanism includes a second update mechanism configured to update said expected load duration for each object in response to said request history for said object.

52. A system as in claim 51, wherein said second update mechanism includes an initial duration determination mechanism configured to estimate an initial expected load duration for said object; and a probability distribution update mechanism configured to update said expected load duration for said object in response to said request history.

53. A system as in claim 51, wherein said second update mechanism includes an initial load determination mechanism configured to estimate an initial expected load duration for said object;

a new load determination mechanism configured to determine a new expected load duration for said object in response to said request history; and a composite determination mechanism configured to determine a composite value of said initial expected load duration and said new expected load duration.

54. A system as in claim 51, wherein said second update, mechanism includes a load adjustment mechanism configured to update said expected load duration for a particular object when said object is reloaded.

55. A computer program product including:

a computer storage medium having computer readable code embodied therein for causing a computer to automatically refresh cached objects, said computer readable code including:

computer readable program code configured to cause said computer to effect a cache; and computer readable program code configured to cause said computer to effect a cache refresh mechanism configured to automatically refresh a set of objects maintained in said cache in response to an estimate for each particular object in said set that said object is stale;

wherein said cache refresh mechanism includes:

computer readable program code configured to cause said computer to effect a first probability determination mechanism configured to estimate, for each said object, a probability that said object will be next requested and will also be stale; and computer readable program code configured to cause said computer to effect a refresh mechanism configured to automatically refresh a first object in response to said probability that said object will be next requested and will also be stale.

56. A computer program product as in claim 55, wherein said cache refresh mechanism is responsive to an estimate for said particular object that said object will be requested soon.

57. A computer program product as in claim 55, wherein said first probability determination mechanism includes computer readable program code configured to cause said computer to effect an update mechanism configured to update an estimated probability distribution for each object in response to a request history for said object.

58. A computer program product as in claim 55, wherein said first probability determination mechanism includes computer readable program code configured to cause said computer to effect an update mechanism configured to update said probability for each object in response to an update history for said object.

59. A computer program product as in claim 58, wherein said update mechanism includes computer readable program code configured to cause said computer to effect an initial probability determination mechanism configured to determine an initial estimated probability distribution of server changes to said object;

computer readable program code configured to cause said computer to effect a new probability determination mechanism configured to determine a new estimated probability distribution of server changes to said object in response to said update history; and computer readable program code configured to cause said computer to effect a composite determination mechanism configured to determine a composite value of said initial estimated probability distribution and said new estimated probability distribution.

* * * * *